United States Patent
Bradley et al.

(10) Patent No.: US 10,262,530 B2
(45) Date of Patent: Apr. 16, 2019

(54) DETERMINING CUSTOMIZED SAFE SPEEDS FOR VEHICLES

(71) Applicant: Cambridge Mobile Telematics, Cambridge, MA (US)

(72) Inventors: William Francis Bradley, Arlington, MA (US); Hari Balakrishnan, Belmont, MA (US); Paresh Govind Malalur, Cambridge, MA (US)

(73) Assignee: Cambridge Mobile Telematics, Cambridge, MA (US)

( * ) Notice: Subject to any disclaimer, the term of this patent is extended or adjusted under 35 U.S.C. 154(b) by 5 days.

(21) Appl. No.: 15/384,730

(22) Filed: Dec. 20, 2016

(65) Prior Publication Data
US 2018/0174484 A1    Jun. 21, 2018

(51) Int. Cl.
| | | |
|---|---|---|
| *G08G 1/052* | (2006.01) | |
| *G06Q 40/08* | (2012.01) | |
| *G08G 1/01* | (2006.01) | |
| *G08G 1/0967* | (2006.01) | |

(52) U.S. Cl.
CPC .............. *G08G 1/052* (2013.01); *G06Q 40/08* (2013.01); *G08G 1/0112* (2013.01); *G08G 1/0129* (2013.01); *G08G 1/0141* (2013.01); *G08G 1/096716* (2013.01); *G08G 1/096741* (2013.01); *G08G 1/096775* (2013.01)

(58) Field of Classification Search
CPC ........ G09B 19/167; G09B 9/04; G09B 9/052; G09B 19/16; G09V 19/14; B60K 2350/1092; B60W 40/09; B60W 2550/14; B60W 2550/20; B60R 16/0236; B60T 2220/02; B60T 8/172
See application file for complete search history.

(56) References Cited

U.S. PATENT DOCUMENTS

| | | | |
|---|---|---|---|
| 9,310,214 B1 | 4/2016 | Tzamaloukas | |
| 2003/0093209 A1* | 5/2003 | Andersson | ......... B60K 31/0058 701/93 |
| 2010/0286899 A1 | 11/2010 | Jain et al. | |
| 2011/0282627 A1 | 11/2011 | Jang et al. | |
| 2014/0322676 A1* | 10/2014 | Raman | ................. G09B 19/167 434/65 |
| 2015/0057831 A1 | 2/2015 | Finlow-Bates | |
| 2016/0144713 A1* | 5/2016 | Verheijen | ........... G01C 21/3469 701/123 |
| 2016/0250983 A1 | 9/2016 | Miller et al. | |

OTHER PUBLICATIONS

International Search Report, dated Mar. 27, 2018 (8 pages).

* cited by examiner

*Primary Examiner* — Jerry-Daryl Fletcher
(74) *Attorney, Agent, or Firm* — Occhiuti & Rohlicek LLP (57) ABSTRACT

Customize safe speeds for vehicles are determined from information that is collected from multiple trips and multiple drivers across many road segments. The information collected includes the speed traveled along the road segment, possibly along with additional information, such as (for example) driver, time of day, day of week, weather and road conditions, angle of the sun or other factors. Given information from a new trip, the driver's speed can be compared on each road segment with relevant data from previous trips (from e.g., similar roads, weather conditions, drivers). The comparison yields a score representing the safety of the driver's speed.

18 Claims, 7 Drawing Sheets

DETERMINING CUSTOMIZED SAFE SPEEDS FOR VEHICLES

BACKGROUND

This invention relates to the assessment of safe vehicular speeds, and more particularly to measuring populations of drivers in varying driving conditions to determine such safe speeds. In some aspects, a goal is to determine a "customized speed limit" based on the individual driver and the road conditions at the time of travel.

Drivers, municipalities and insurance companies have a shared interest in encouraging people to travel at safe speeds. Determining a safe speed, however, can be difficult.

Figure 1:
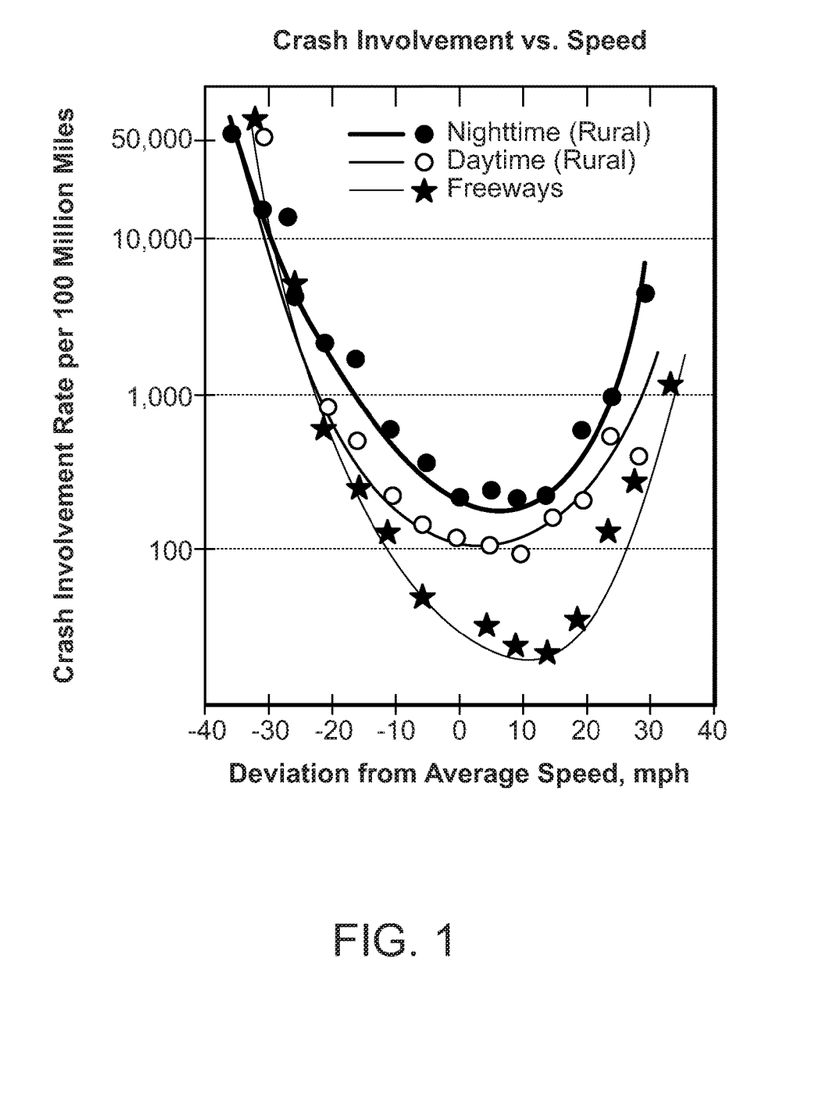
FIG. 1 shows how vehicle crash risk increases when drivers deviate from the average speed.

Frequently, safe speeds have been determined by comparison with an official speed limit. Municipalities typically set speed limits by performing a "traffic and engineering survey". The survey measures actual driving speeds on the road in question and the speed limit is often set based on the 85th percentile of observed speed. The decision to use the $85^{th}$ percentile was motivated by the "Solomon Curve" shown in FIG. 1. This curve shows that the risk of crash is related to the deviation from the average speed; traveling significantly faster or slower than the typical speed is associated with an elevated rate of crashing.

A single official speed limit, however, presumes that there is a universal safe speed for a road segment. However, a safe speed is highly dependent on the driver and the road conditions. For example, the speed limit may not reflect a safe speed because of weather (rain, snow, fog, wind speed), construction, darkness, sun glare, traffic, an inexperienced driver, an exhausted driver, or a host of other factors.

Furthermore, it can be difficult to gauge the degree of safety based solely on a single speed limit. For example, exceeding the speed limit by 15 miles per hour may be safe on some roads but dangerous on others. Because of this ambiguity, there is no accepted method to compare a driver's fine-grained speeding behavior across different road segments. Therefore, it can be difficult to identify where a driver's most dangerous speeding occurs.

This difficulty makes it harder to help drivers modify their own behavior to become safer, and harder for municipalities or insurance companies to assess risk.

SUMMARY

In one aspect, in general, information is collected from multiple trips and multiple drivers across many road segments. The information collected includes the speed traveled along the road segment, possibly along with additional information, such as (for example) driver, time of day, day of week, weather and road conditions, angle of the sun or other factors. Given information from a new trip, the driver's speed can be compared on each road segment with relevant data from previous trips (from e.g., similar roads, weather conditions, drivers). The comparison yields a score representing the safety of the driver's speed.

In another aspect, in general, a smart phone executing an application travels with a driver in a vehicle and records the vehicle's speed, its location along a road network, and the time of travel. The recorded data is sent to a server, either on an ongoing basis, or in a batch from time to time. The server stores the data for a plurality of vehicles representing travelling speed on a plurality of road segments of a road network.

For each road segment of the plurality of road segments, the collected data is processed for the road segment to determine speed characteristics for the road segment. For example, a server computes a cumulative distribution of the speeds observed during rush hour travel and during non-rush hour travel. In some embodiments, once a characterization has been made, it is then used to label certain ranges of speeds as e.g. "safe", "slightly risky", or "very risky".

For the assessment of an individual vehicle, vehicle data is collected from that vehicle for each road segment the vehicle travels on over the course of a trip. This data is used to compute a segment-specific risk score for each road segment. These segment-specific scores are aggregated for each road segment in the trip to create a global risk for the trip, or for multiple trips. For example, in some embodiments, the median speed of the individual vehicle may be compared with the median speed of other vehicles in similar conditions. This score can then be provided to the driver of the vehicle, or alternatively to a third party, for instance, an insurance company In another aspect, in general, a method is directed to characterizing a target vehicle's speed on a road network. The method includes collecting and storing data, which includes segment speed from one or more vehicles traversing a plurality of road segments of a road network. For each road segment of the plurality of road segments, the data collected associated with the road segment is processed to determine a speed characterization for said road segment. Data from the target vehicle is also collected (e.g., in conjunction with or after the collecting of the data for the one or more vehicles) for each road segment in a sequence of road segments. For one or more road segments in the sequence of road segments, the speed characterization for said road segment and the data collected from the target vehicle on said segment are combined to compute a segment-specific score for the target vehicle's speed on said segment. Data characterizing the vehicle's speed determined from one or more of the segment-specific scores is the provided.

Aspects may include one or more of the following features.

Providing the data characterizing the vehicle's speed comprises providing said data to a driver of the target vehicle.

The method further includes aggregating the segment-specific score for each road segment in the sequence of road segments to compute a driving score for the target vehicle. Providing the data characterizing the vehicle's speed comprises providing the driving score.

In collecting and storing the data, the one or more vehicles comprises a plurality of vehicles.

In collecting and storing the data, the data comprises a plurality of the segment speeds, each segment speed associated with a correspond road segment, vehicle or driver of a vehicle, and time of traversal of the segment.

Processing the data collected associated with a road segment to determine a speed characterization for said road segment comprises determining a distribution of speed of vehicles of said road segment.

Combining the speed characterization and data collected from the target vehicle to compute a segment-specific score for the target vehicle's speed comprises combining the distribution of speed of said road segment and a speed determined from the data collected for the target vehicle.

Combining the distribution of speed of said road segment and a speed determined from the data collected for the target vehicle comprises determining a percentile of the speed for the target vehicle in the distribution of speed of the road segment.

The segment-specific score for the target vehicle's speed comprises a score determined from the percentile.

The score determined from the percentile comprises a quantitative score.

The score determined from the percentile comprises a categorical score.

The distribution of speed of vehicles of said road segment comprises using segment speeds collected for vehicles traversing said road segment.

Determining the distribution of speed of vehicles of said road segment further comprises using segment speeds collected for vehicles traversing other road segments that are similar to said road segment.

Determining the distribution of speed of vehicles comprises weighting data for the road segments that are similar according to their similarity.

The segment-specific score for the target vehicle's speed comprises a categorical score.

In another aspect, in general a machine-readable medium comprises instructions stored thereon. Executing the instructions on a processor causes the processor to perform all the steps of any method set forth above.

In another aspect, in general, a computer-implemented system includes a processor configured to perform all the steps of any method set forth above.

Advantages of one or more embodiments may include the following.

Empirical data on driver speed on a road segment may provide a more accurate assessment of safe speeds than speed limits based on conventional traffic and engineering survey approaches. Furthermore, the empirical data collected using these approaches may be used to inform municipalities or other entities that set sped limits. For example, since many speed limits are set with the intention of being the $85^{th}$ percentile of speeds driven on a road, the 85th percentile of empirical speed on a road segment can be dynamically computed, making for a more accurate suggested speed limit.

The data collection approach may provide a greater amount of data collected at a lower cost than conventional road survey approaches. This in turn allows for a better estimation of the $85^{th}$ speed percentile. Given the sheer volume of data that is to be dealt with, the results of its analysis can be updated continuously, and be made available more promptly.

Municipalities or insurance companies may be most interested in the most frequently traveled road. One or more embodiments may be capable of producing accurate estimates of high-traffic road segments rapidly, since the most data is collected there. The collection of large quantities of data would also allow for the inference of speed limits from empirical data for populating map databases.

Aspects allow for the estimation of relative driving behavior for individual drivers or vehicles. Given an empirical speed distribution, the server can associate a percentile for each trip taken by a user. A user's behavior can then be described as a distribution over percentiles. This description allows us to combine behavior from different road segments. It may be further useful to characterize the driver's speeding habits based on the functional class of the road (e.g., major highway versus small side street), road geometry, time of day, inclement weather, and so forth.

The safe speed on a road segment is often a function of road conditions. For example, a driver may need to drive more slowly on a road at night than during the day. This invention allows the estimation of conditional empirical speed distributions, where any of the following may be factors in this estimation: weather conditions on a given road segment, time of day, day of the week, or direction of one's driving with respect to solar glare (whether or not "the sun is in your eyes").

In order to help a driver become safer, the system can identify on which roads the driver speeds the most relative to other drivers. Identifying such roads benefits from an empirical distribution, e.g., from knowledge of percentiles above the 85th.

Other features and advantages of the invention are apparent from the following description, and from the claims.

DESCRIPTION

Figure 2:
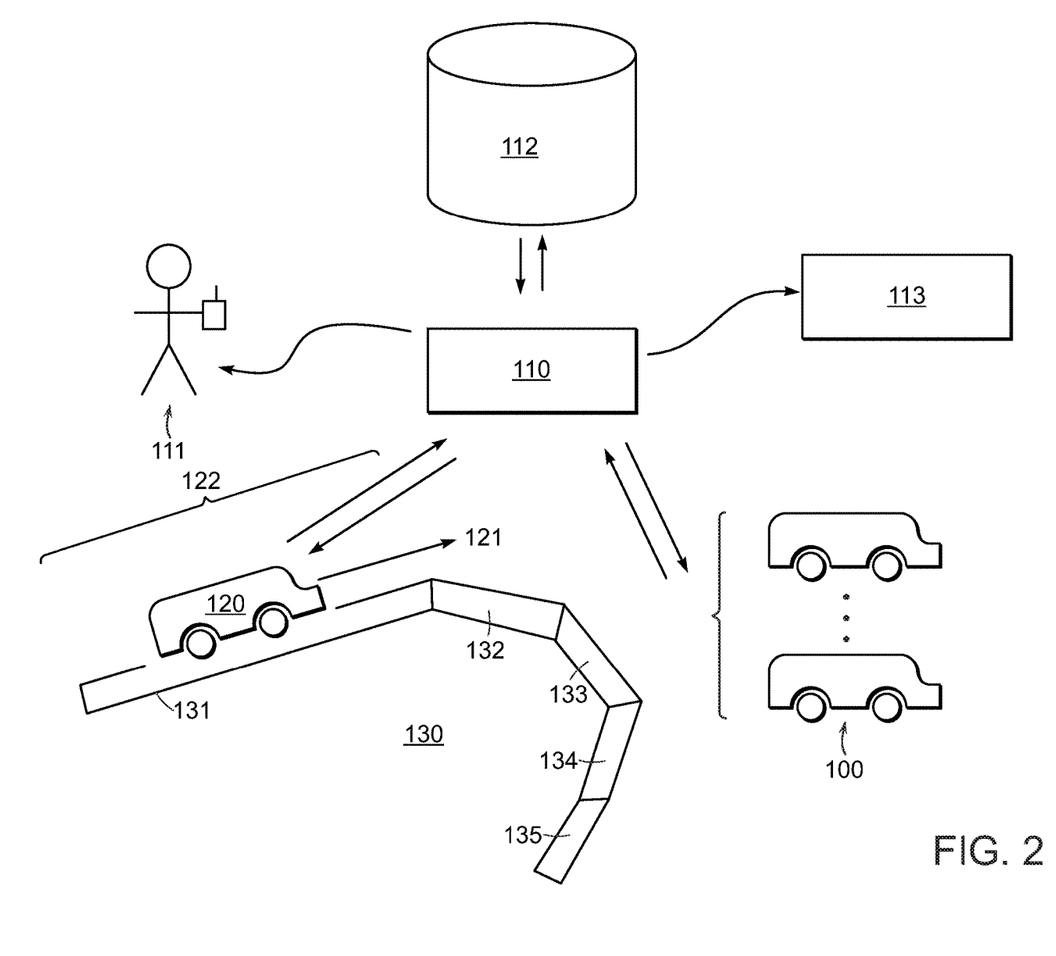
FIG. 2 is an illustration showing a process of communicating driving information between a server and a plurality of vehicles, a user, and a third party.

Referring to FIG. 2, a number of cars 100 are able to communicate with a server 110 in order to provide the server with driving information about each car. More specifically, in a number of embodiments, drivers of the cars carry personal devices, such as smartphones, that internally include sensors, processors, and communication device that are used to collect speed, location and time data and communicate that data with the server. The server 110 maintains a log 112 of driving information for all vehicles. The server then provides feedback to each driver about their performance based on the log data 112 from the cars. A representative car 120 is shown on a roadway 130. Roadway 130 is shown to be divided into smaller road segments 131-135, with car 120 occupying road segment 131.

As a vehicle traverses a particular road segment (e.g., road segment 131 in FIG. 1), the personal device in the vehicle collects a time series of speed samples (e.g., one sample per second). These samples may be summarized as a single number (e.g., mean or median speed), as several numbers (e.g. mean and variance of speed), or retained as the full set of speed samples. We will refer to the full speed samples or their summary as the "segment speed" for the user on that segment. As a vehicle 120 traverses multiple road segments on a trip (e.g., including segments 131-135), the personal device determines the segment speed 122 on each road segment for the vehicle on the trip. Very generally, the vehicle's segment speed on a segment is compared to the distribution of segment speeds (on the same or similar segments) from other trips at the server 110, weighted by the similarity of the trip. This comparing yields the information about the driver's performance.

For a particular road segment traversed by a particular vehicle, the server 110 computes a score by comparing the segment speed with the segment speeds logged for the same segment (or similar segments) from other similar trips, and combining the comparisons according to a weighting based on the similarity of the trips. The other trips may be from the same or other drivers. Similarity of trips is based on a combination of one or more of the following measures: weather (including rain, snow, fog, wind speed), construction, darkness, sun glare, traffic, driver experience, driver exhaustion, driver distraction, typical speeds for this driver or this vehicle on this or other road segments, or other features of the road, driver and environment. Henceforth we refer to such measures as "covariate measures". Use of similar segments is discussed further below.

Figure 3:
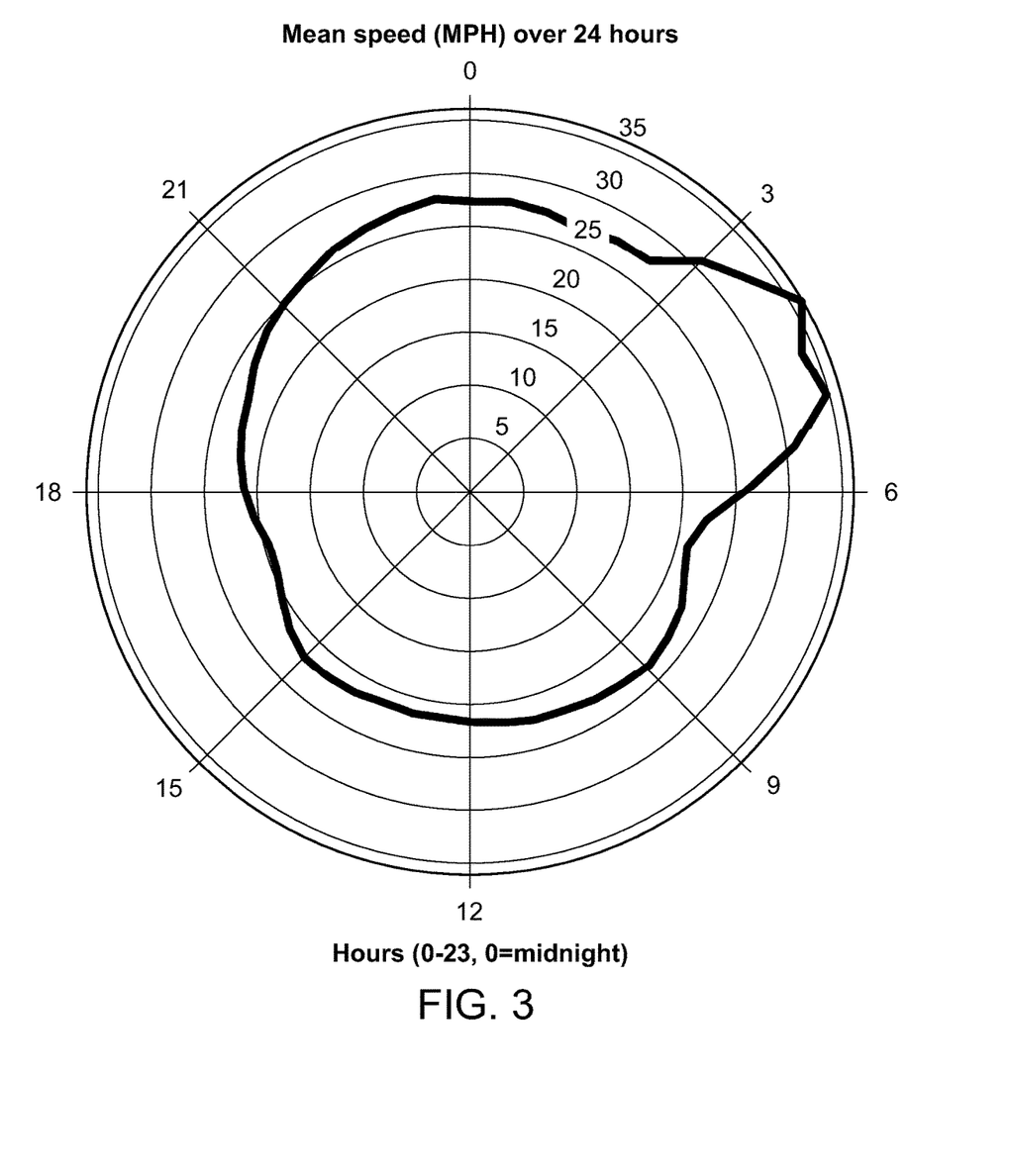
FIG. 3 is a polar graph of average speed as a function of time of date.
Figure 4:
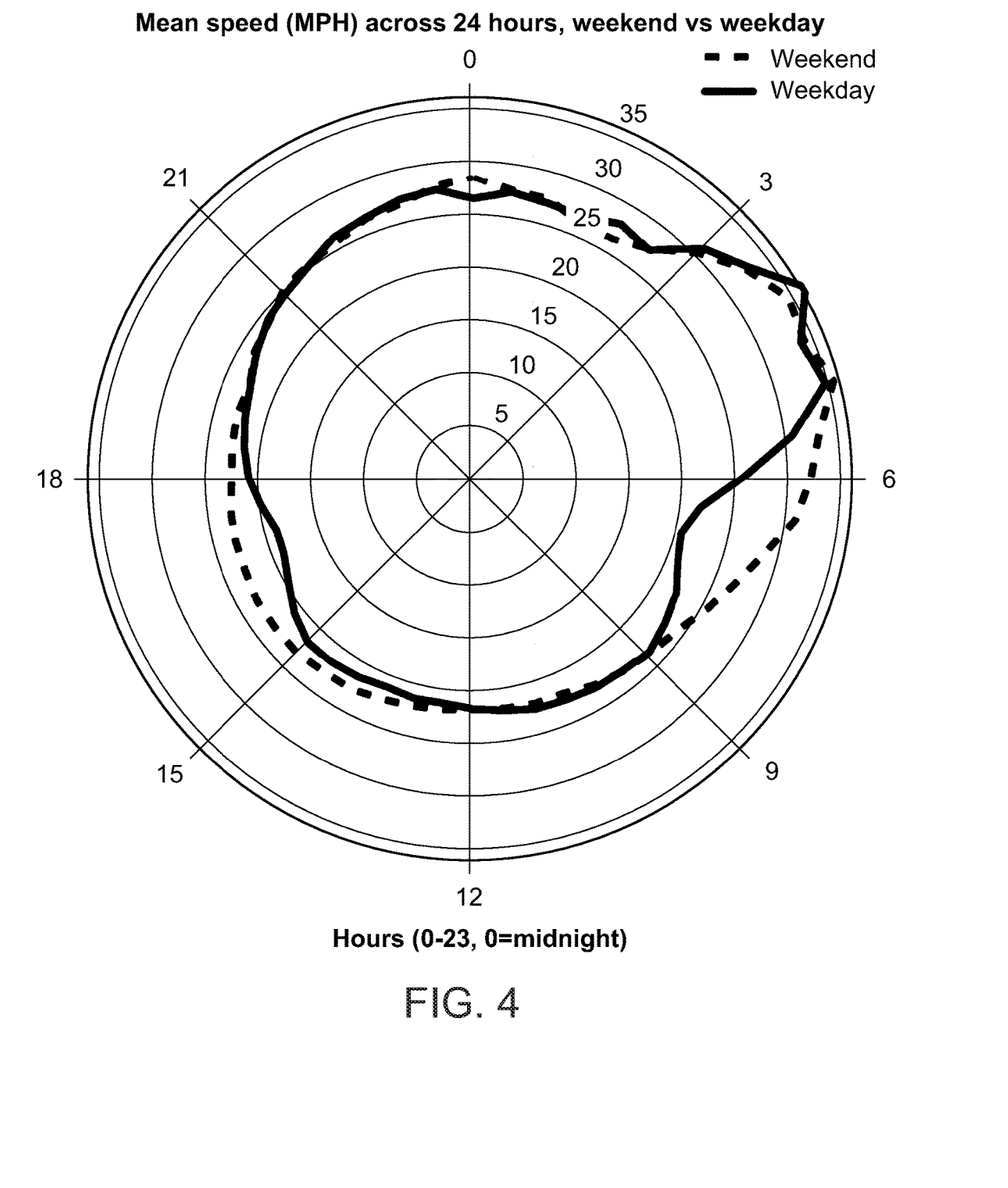
FIG. 4 is a polar graph average speed as a function of time of day and weekend versus weekday.

To determine the weights for the combining of the comparisons, the system takes into account how the speed distribution changes as a function of covariate measures. We provide two examples. These weights are typically informed by measurements of speed as the covariate measures vary across drives. For example, FIG. 3 illustrates variability in mean speed across time of day; driving speed during the early morning (3 am-6 am) is much faster than driving during the day. FIG. 4 illustrates the value of combining multiple covariate measures, in this case, time of day and weekend versus weekday. The reduction in typical speed during a weekday rush hour is evident.

There are several ways to set the weights. First, the weights can be set directly through expert knowledge of the system. Second, the weights can be set to maximize the likelihood of held-out speed data. Third, the weights can be set to maximize the accuracy of prediction of the safety data.

We give a more detailed example of the third technique for setting weights. Suppose our safety data consists of the time and location of vehicle crashes. We imagine that there is some unknown probability of a crash on a road segment R given the speed and covariate measures. We will write this as prob(crash on R|speed, covariate measures). For an individual road segment in isolation, we can use a logistic regression to set the weights of the covariates. To combine statistical information across multiple road segments, we can choose a set of weights randomly and separate the crash data into a training and test set. We can use, e.g., stochastic gradient descent to optimize the weights on the training data, using the test data for validation to prevent overfitting.

Once we have computed a score per road segment, we can report this score directly to an interested party (such as the driver). We can also aggregate the segment scores per trip, per user, per vehicle, per calendar time (e.g., mean score over two weeks of driving), per driving time (e.g., mean score per hour of driving), or per distance (e.g., mean score per kilometer).

Figure 5:
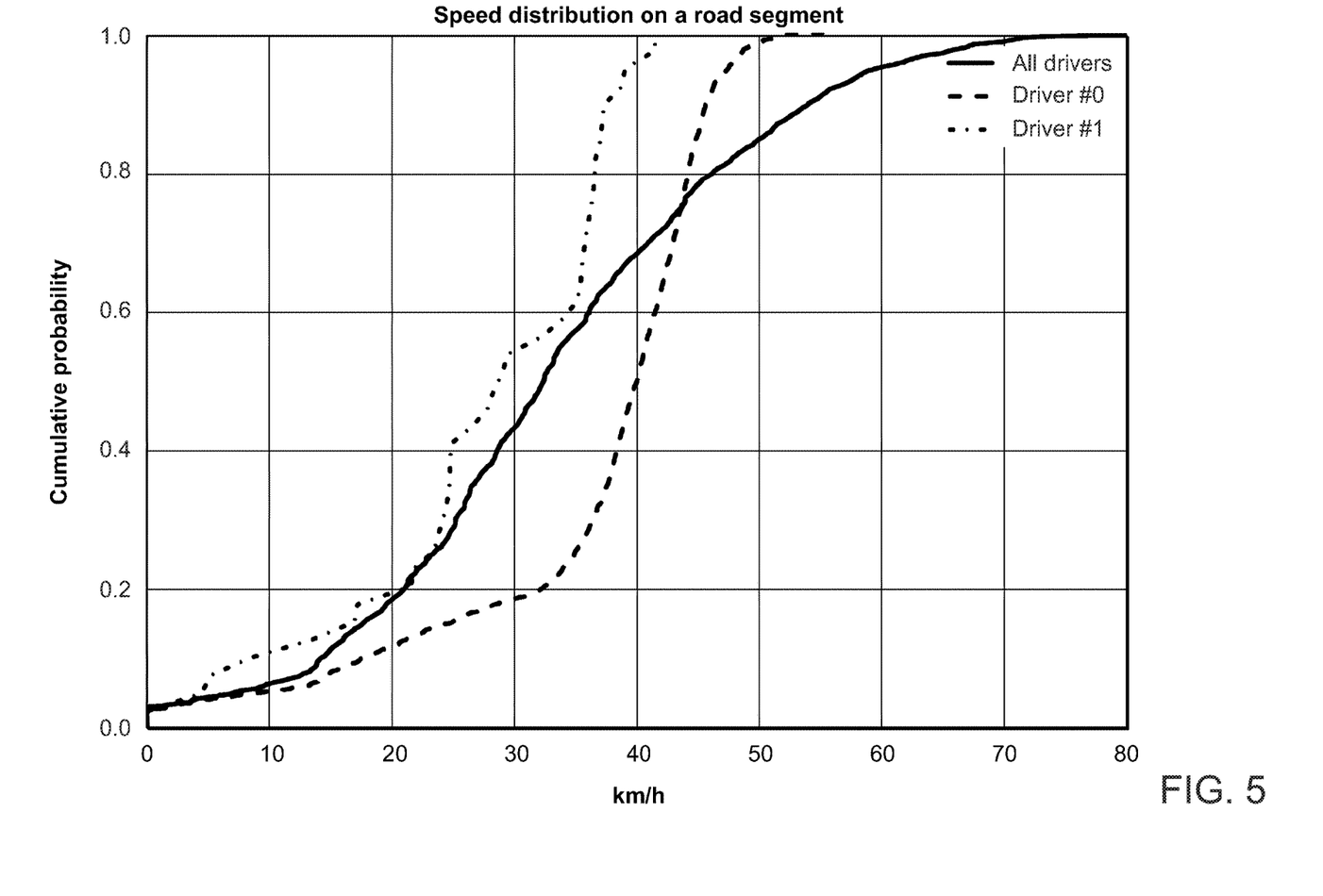
FIG. 5 is a cumulative density function (CDF) of speed on an actual road segment, along with the speed CDFs of two particular drivers.

FIG. 5 illustrates the cumulative distribution function (CDF) of speed on a single road segment, across many drivers and trips, weighted by driver. It additionally illustrates the CDFs of two particular drivers. The drivers' CDFs differ from the common CDF and from each other.

Figure 6:
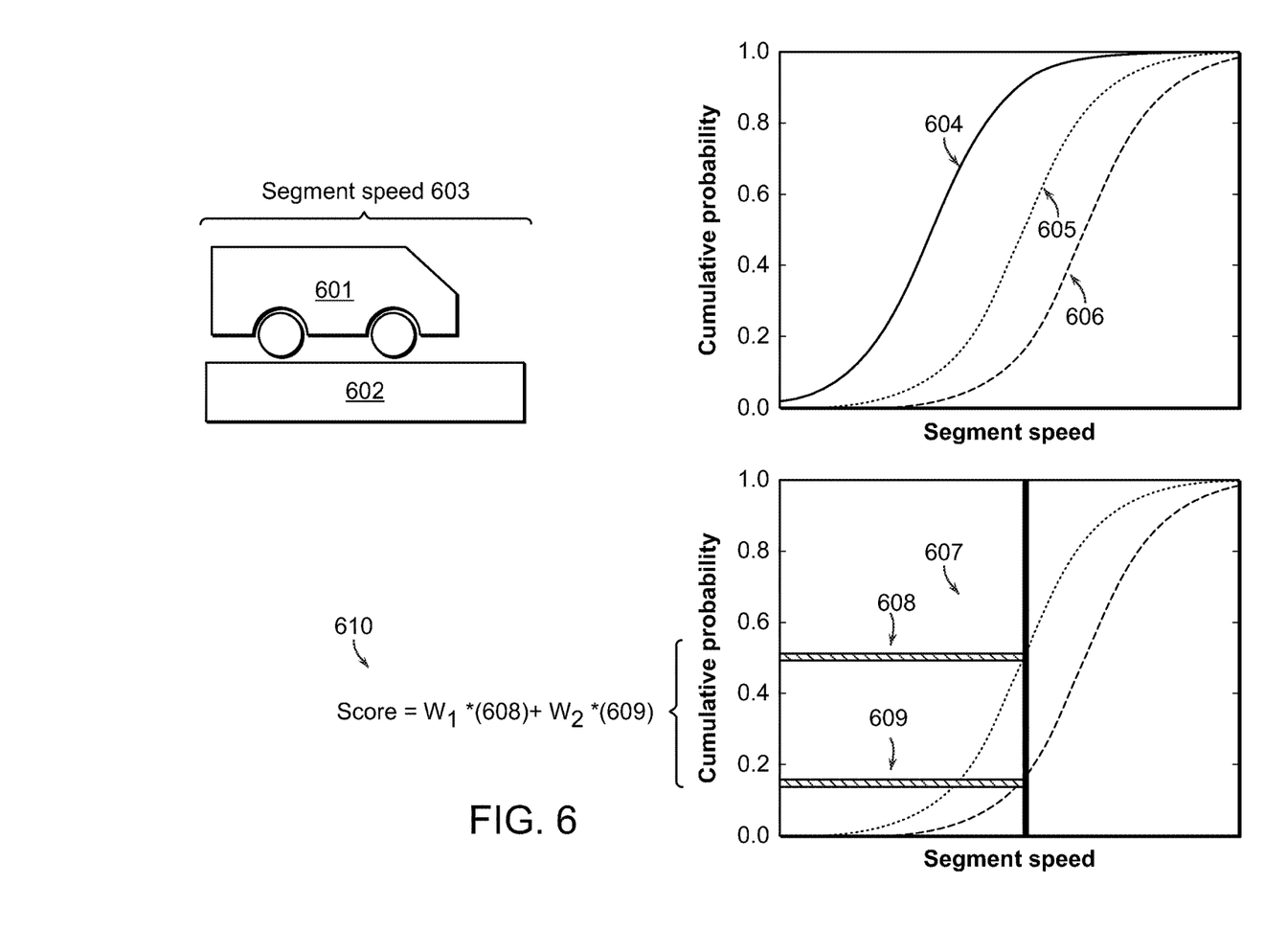
FIG. 6 is an illustration of an approach to converting speed measurements into a driving score.

We provide a more detailed example for clarity. (The numerical values, covariate measures and weights are provided as examples for concreteness, and may vary in different embodiments.) This example is illustrated in FIG. 6. Suppose vehicle 601 traversed road segment 602 from 8:30 AM to 8:32 AM, on a Monday, in light rain, traveling at segment speed 603.

We consider separate other trips on the same road segment into three categories and compute the empirical cumulative distribution function for each category: trips that occurred between 8:00-9:00 AM on a week day in light rain (605); trips that occurred between 7:00-8:00 AM or 9:00-10:00 AM in light rain (606); and all other trips (604). The segment speed 603 corresponds to a vertical line (607) on the plot; in general, this vertical line intersects each CDF at a different height (quantile). The intersection with CDF 605 is marked by 608 (at quantile 0.50), and the intersection with CDF 606 is marked by 609 (at quantile 0.15). We produce a final score by taking a weighted combination of the quantiles (608) and (609), as denoted by 610. For example, we might take score=0.7*(0.5)+0.3*(0.15)=0.395. (We give 604 a weight of zero, and thus do not bother including it in the weighted sum.)

If the road segment score exceeded the $85^{th}$ percentile or fell below the $15^{th}$ percentile (i.e., score>0.85 or score<0.15), we may interpret the score as "mildly risky"; if it exceeds the $95^{th}$ percentile or fell below the $5^{th}$ percentile, we may interpret the score as "very risky".

The observed quantiles for two different drivers can vary substantially.

Figure 7:
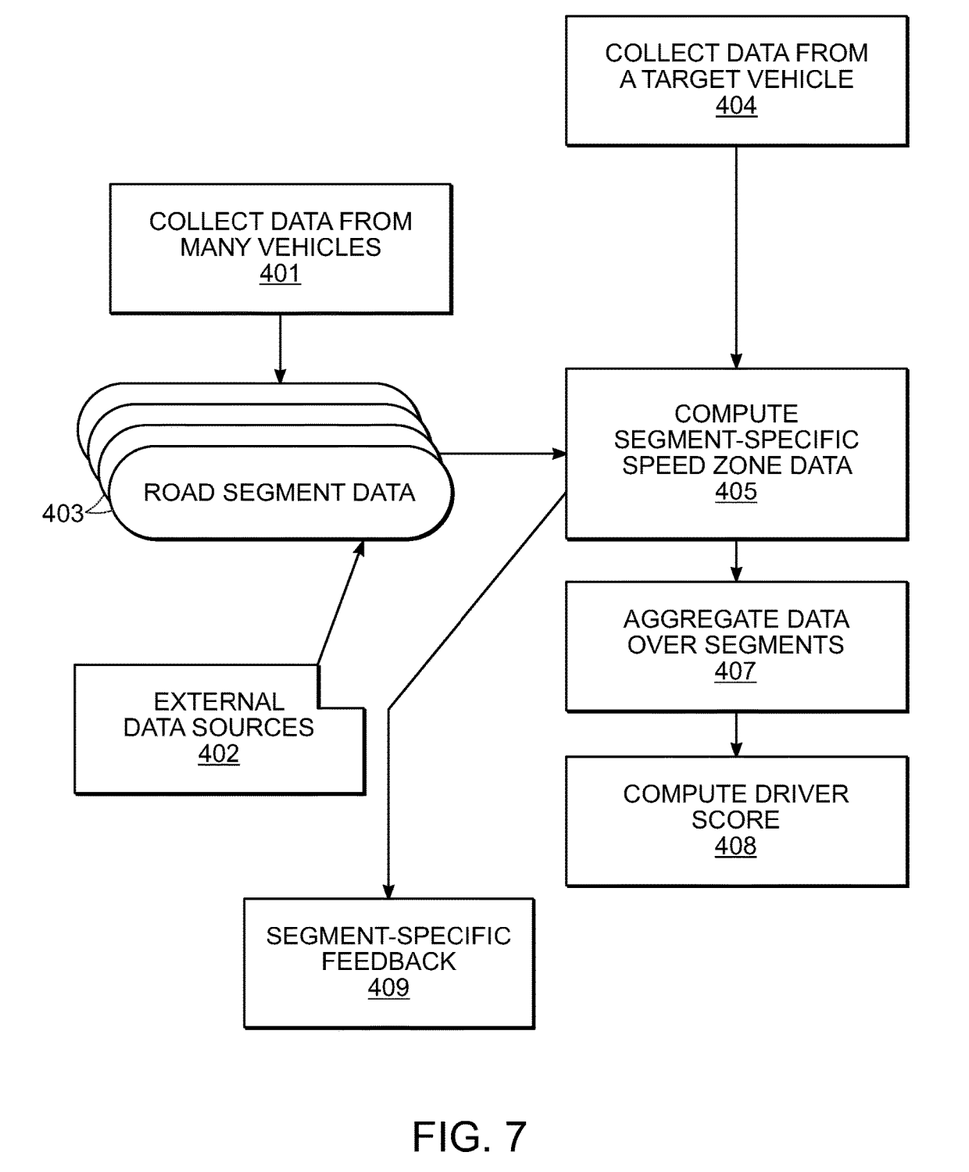
FIG. 7 is a flowchart describing the process corresponding to FIG. 2.

Operation of the system described above can be understood with reference to the flowchart shown in FIG. 7. Referring to FIG. 7, the system collects segment speed data from multiple vehicles (step 401). As discussed above, this data may be first collected in the vehicle, and then sent to a server in batches, or alternatively, the data may be sent to the server on an ongoing basis. This data for each road segments is used to compute segment data 403 for all the segments (step 402). The server also collects data for a specific vehicle (step 404). Using the road segment characteristics 403, the system computes segment-specific speed data for the user, for example, the median speed traveled in the segment (step 405). The system aggregates the segment-specific data over the road segments traveled by the vehicle (step 407), and computes a driver score (step 408), which can be provided to the driver or a third party. In some examples, the aggregated score may be specific to a class (i.e., type) of road segments, for example, for highway or surface street, or some other category, such as time of day, for example, daytime versus nighttime driving.

Some aspects may vary in other embodiments. In particular, instead of the median, we may record alternate statistics of the speed across a segment, such as the mean speed, the mean and variance, the Z-score, the median and interquartile range, or all the speed samples. The score (for a road segment, trip or trips) may include a confidence interval or other indication or uncertainty. Rather than evaluating the observed speed, a speed margin can be added to forgive some fraction of risky speeding. For example, the observed median speed for an individual road segment under evaluation can be modified to be, e.g., 5 miles per hour closer to the population median speed. The output score can be either discrete (e.g., "safe" vs "slightly risky" vs "very risky") or continuous (e.g., 0.12 vs 0.87). To avoid overweighting drivers who drive on the same road segment many times, the weight can be reduced by the number of trips per driver on that road segment. (E.g., if a driver traverses a particular road segment X times, reduce the weight by an additional multiplicative factor of X.)

When insufficient data is available to estimate a speed distribution (i.e., sparse or missing data) for a particular road segment only from logged data for that segment, the speed distribution can be inferred from data on similar road segments in similar conditions. For example, by finding other road segments of similar road type (e.g., highway or surface street), road geometry, and road conditions, the speed samples can be pooled and a speed distribution can be inferred for all the similar road segments.

Alternatively, when dealing with sparse data, speed samples may be used from differing road segments (or the same road segment in different environments) by transforming the speed samples to representative speed samples of the appropriate type. For example, suppose we observe the speed distribution for road segment A and road segment B, both in clear weather. We match speed samples based on quantiles and fit a regression R1. Next, we fit a speed regression R2 on segment A between speeds in clear weather versus rain. By applying R2 and R1 on the original CDF of road segment A in clear weather, we obtain an estimate for the CDF of road segment B in the rain.

When transforming and combining samples from various different road segments and conditions, the weight of these additional samples are reduced based on the inaccuracy of the estimate (e.g., if the transformation produces an estimate with high variance, the transformed sample's weight would be low). The uncertainty of the regression may be estimated through various techniques, such as using Gaussian process regression. The estimation techniques may rely on a notion of the similarity of two road segments. A quantitative measure of similarity is provided by the weights discussed in paragraph 32.

An additional technique for handling sparse data is to leverage the prior driving history of the drivers. For example, suppose we wish to estimate the $85^{th}$ percentile of the mean speed on a road segment. Absent additional information, it would require many samples to make a reliable estimate. Suppose we only have a single measurement on the road segment. However, suppose prior measurements indicated that that particular driver regularly drove between the $83^{th}$ and $87^{th}$ percentile on most other roads. The single data point is then a fairly accurate estimate of the $85^{th}$ percentile. Leveraging the prior speeding behavior of all the drivers allows for more accurate estimates of speed distributions with less data.

In one or more examples described above, a driver's smartphone is used to collect the speed and location data for the vehicle. Alternative embodiments may use techniques described in U.S. Pat. No. 8,457,880, "TELEMATICS USING PERSONAL MOBILE DEVICES," and in U.S. Pat. No. 9,228,836, "INFERENCE OF VEHICULAR TRAJECTORY CHARACTERISTICS WITH PERSONAL MOBILE DEVICES," which are incorporated herein by reference. Furthermore, a device affixed to the vehicle, for example, a tag as described in US Past. Pub US2015/0312655A1, "SYSTEM AND METHOD FOR OBTAINING VEHICLE TELEMATICS DATA," which is also incorporated herein by reference.

In other embodiments, the system may factor in a roadway's speed limit in addition to population speeds when determining safe speed ranges for a road segment.

In the interests of preserving battery life or reduce data transmission, it is possible to record and/or transmit only a portion or summary of the underlying speed measurements.

Implementation of the approaches described above may implement the data processing steps (e.g., data storage, data reduction, and data communication) using hardware, software, or a combination of hardware and software. The hardware can include application specific integrated circuits (ASICS). The software can instructions stored on a non-transitory medium (e.g., non-volatile semiconductor memory) for causing one or more processors in a tag, the smartphone, and/or the server, to perform the procedures described above.

It is to be understood that the foregoing description is intended to illustrate and not to limit the scope of the invention, which is defined by the scope of the appended claims. Other embodiments are within the scope of the following claims.

What is claimed is:

1. A method for characterizing a target vehicle's speed on a road network, the method comprising:
   collecting and storing data, the data including segment speed from one or more vehicles traversing a plurality of road segments of a road network, said data associating a plurality of the segment speeds with corresponding road segments and one or more covariate measures selected from a covariate measure group consisting of weather condition, time of day, day of week, solar glare, construction, traffic, driver experience, driver exhaustion, driver distraction, road type, road geometry, and road condition;
   for each road segment of the plurality of road segments, processing the data collected associated with the road segment to determine a speed characterization for said road segment including determining a distribution of speed of vehicles on said road segment dependent on the one or more covariate measures using segment speeds collected for vehicles traversing said road segment and using segment speeds collected for vehicles traversing other road segments that are similar to said road segment;
   collecting data from the target vehicle for each road segment in a sequence of road segments, including determining the one or more collected covariate measures from the covariate measure group associated with said collected data;
   for one or more road segments in the sequence of road segments, combining the speed characterization for said road segment dependent on the one or more collected covariate measures and the data collected from the target vehicle on said road segment to compute a segment-specific score for the target vehicle's speed on said road segment; and
   providing data characterizing the target vehicle's speed determined from one or more of the segment-specific scores, including providing a degree safety for presentation to at least one of a driver of the target vehicle and a party for the purpose of assessing risk.

2. The method of claim 1 wherein providing the data characterizing the vehicle's speed comprises providing said data to a driver of the target vehicle.

3. The method of claim 1 further comprising:
   aggregating the segment-specific score for each road segment in the sequence of road segments to compute a driving score for the target vehicle; and
   wherein providing the data characterizing the vehicle's speed comprises providing the driving score.

4. The method of claim 3, wherein the segment-specific score for the target vehicle's speed on a road segment comprises a degree of safety of the driver's speed, and the driving score for the target vehicle characterizes an aggregate degree of safety.

5. The method of claim 4, wherein providing the driving score comprises providing the aggregate degree of safety to the driver of the vehicle.

6. The method of claim 4, wherein providing the driving score comprises providing the aggregate degree of safety to an insurance company for a purpose of assessing risk.

7. The method of claim 1 wherein in collecting and storing the data, the one or more vehicles comprises a plurality of vehicles.

8. The method of claim 1 wherein in collecting and storing the data, the data comprises a plurality of the segment speeds, each segment speed associated with a correspond road segment, vehicle or driver of a vehicle, and time of traversal of the segment.

9. The method of claim 1 wherein combining the speed characterization and data collected from the target vehicle to compute a segment-specific score for the target vehicle's speed comprises combining the distribution of speed of vehicles on said road segment and a speed determined from the data collected for the target vehicle.

10. The method of claim 9 wherein combining the distribution of speed of vehicles on said road segment and a speed determined from the data collected for the target vehicle comprises determining a percentile of the speed for the target vehicle in the distribution of speed of the road segment.

11. The method of claim 10 wherein the segment-specific score for the target vehicle's speed comprises a score determined from the percentile.

12. The method of claim 11 wherein the score determined from the percentile comprises a quantitative score.

13. The method of claim 11 wherein the score determined from the percentile comprises a categorical score.

14. The method of claim 1 wherein determining the distribution of speed of vehicles comprises weighting data for the road segments that are similar according to their similarity.

15. The method of claim 1 wherein the segment-specific score for the target vehicle's speed comprises a categorical score.

16. A machine-readable medium comprising instructions stored thereon, wherein executing the instructions on a processor causes the processor to characterize a target vehicle's speed on a road network including:

receiving and storing data, the data including segment speed from one or more vehicles traversing a plurality of road segments of a road network, said data associating a plurality of the segment speeds with corresponding road segments and one or more covariate measures selected from a covariate measure group consisting of weather condition, time of day, day of week, solar glare, construction, traffic, driver experience, driver exhaustion, driver distraction, road type, road geometry, and road condition;

for each road segment of the plurality of road segments, processing the data collected associated with the road segment to determine a speed characterization for said road segment including determining a distribution of speed of vehicles on said road segment dependent on the one or more covariate measures using segment speeds collected for vehicles traversing said road segment and using segment speeds collected for vehicles traversing other road segments that are similar to said road segment;

receiving data from the target vehicle for each road segment in a sequence of road segments, including determining one or more collected covariate measures from the covariate measure group associated with said received data;

for one or more road segments in the sequence of road segments, combining the speed characterization for said road segment dependent on the one or more collected covariate measures and the data received from the target vehicle for said road segment to compute a segment-specific score for the target vehicle's speed on said road segment; and providing data characterizing the target vehicle's speed determined from one or more of the segment-specific scores, including providing a degree safety for presentation to at least one of a driver of the target vehicle and a party for the purpose of assessing risk.

17. The method of claim 1, wherein the segment-specific score for the target vehicle's speed on a road segment comprises a degree of safety of the driver's speed.

18. The method of claim 15, wherein the categorical score comprises a categorical degree of safety of the driver's speed.

* * * * *